United States Patent

Baker et al.

[11] 4,078,428
[45] Mar. 14, 1978

[54] MEASUREMENT OF FLUID FLOW

[75] Inventors: Roger Cecil Baker, St. Albans; Edward James Thompson, Epping, both of England

[73] Assignee: National Research Development Corporation, London, England

[21] Appl. No.: 633,392

[22] Filed: Nov. 19, 1975

[30] Foreign Application Priority Data

Nov. 21, 1974 United Kingdom ............... 50494/74
Apr. 8, 1975 United Kingdom ............... 14366/75

[51] Int. Cl.$^2$ ............................................. G01F 1/66
[52] U.S. Cl. ................................................ 73/194 A
[58] Field of Search ...................................... 73/194 A

[56] References Cited

U.S. PATENT DOCUMENTS

| 2,746,291 | 5/1956 | Swengel | 73/194 A |
| 3,496,771 | 2/1970 | Moffatt | 73/194 A |
| 3,564,912 | 2/1971 | Malone et al. | 73/194 A |
| 3,940,985 | 3/1976 | Wyler | 73/194 A |

OTHER PUBLICATIONS

B. Pfau – "Optimization of the Test Section Length in Integrating Flow Measurement Methods", Archive for Technical Measurements (ATM) – Sheet V1246-1 (Feb. 1973).

Primary Examiner—Charles A. Ruehl
Attorney, Agent, or Firm—Cushman, Darby & Cushman

[57] ABSTRACT

Apparatus for measuring the mean velocity of fluid flow down a pipe, or quantities related to it such as mean mass flow. Two similar beams of ultrasonic energy are transmitted across the fluid, one beam with an upstream and the other with a downstream component of direction. The output of the apparatus is derived from the difference in time taken by the two beams to pass through the fluid, for instance by the phase difference at the receivers of beams that were transmitted synchronized. By locating the beams so that they are offset from the pipe axis, instead of intersecting it as has been customary, it is possible to depress the effect upon the output of variation in the flow profile, (e.g. laminar, turbulent or uniform) of the fluid. In a circular pipe, such profile effects upon the output will often be minimized if the beams lie in planes parallel to the axis and separated from it by a distance equal to half the radius of the pipe or slightly more.

8 Claims, 7 Drawing Figures

MEASUREMENT OF FLUID FLOW

This invention relates to measuring the flow of fluid down axisymmetric pipes. In particular it relates to apparatus using ultrasonic transmitter/receiver pairs for measuring the average velocity of the flow of liquids and gases down pipes.

Several apparatus have been proposed in which acoustic signals may be used to produce an output indicative of flow velocity, or of parameters related to it such as mass flow rate, and some such apparatus have actually been made and sold. In at least one of these apparatus two transmitting transducers, mounted on the wall of the pipe one upstream of the other, are energized simultaneously and in synchronism from the same source. The beams that they emit travel obliquely and in opposite axial directions across the pipe in a diametrical plane to a pair of receiving transducers, also mounted on the walls of the pipe. The paths from each transmitter to its receiver are of equal length. The difference in time between the arrival of simultaneously emitted signals at their respective receivers can be shown to equal:

$$(2LV \cos \theta/C^2 \qquad (i)$$

where L is the acoustic path length, that is to say the distance between each transmitter and its receiver, C is the velocity of the signals in still fluid, $\theta$ is the angle each signal beam makes with the centre line of the pipe, and V is the average velocity of the fluid in the diametrical plane in which the signals travel.

Unfortunately for most types of fluid flow within a pipe there is no simple relationship between such average velocity V in one plane and the average velocity down the tube as a whole, which is the quantity one usually wishes to known. The relationship is usually a complicated one involving factors related to the Reynolds number of the flow and to other quantities.

The present invention is the result of work to devise flow measuring apparatus to measure average flow and related quantities in ways less dependent upon such complicated factors and in particular upon the flow profile, that is to say the distribution of fluid velocity existing across a cross-section of the pipe. The character of this distribution may vary greatly according mainly as to the nature — e.g. laminar or turbulent — of the flow pattern of the fluid.

The invention is defined by the claims at the end of this specification and examples of it will now be described with reference to the accompanying drawings in which:

Figure 1:
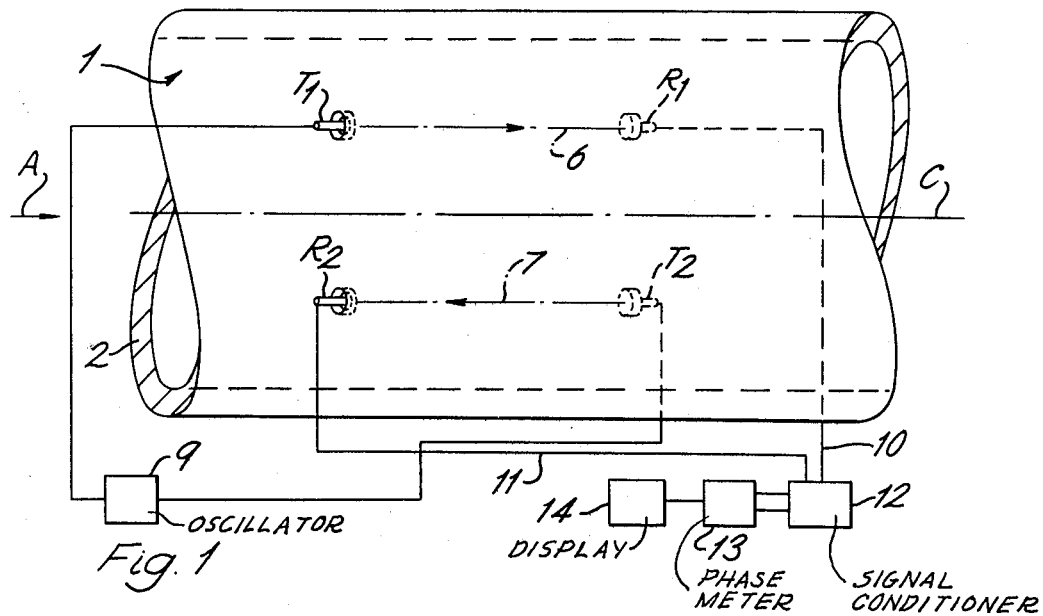
FIG. 1 is a diagrammatic plan view of the pipe of a flow-meter and shows ancillary equipment schematically.
Figure 2:
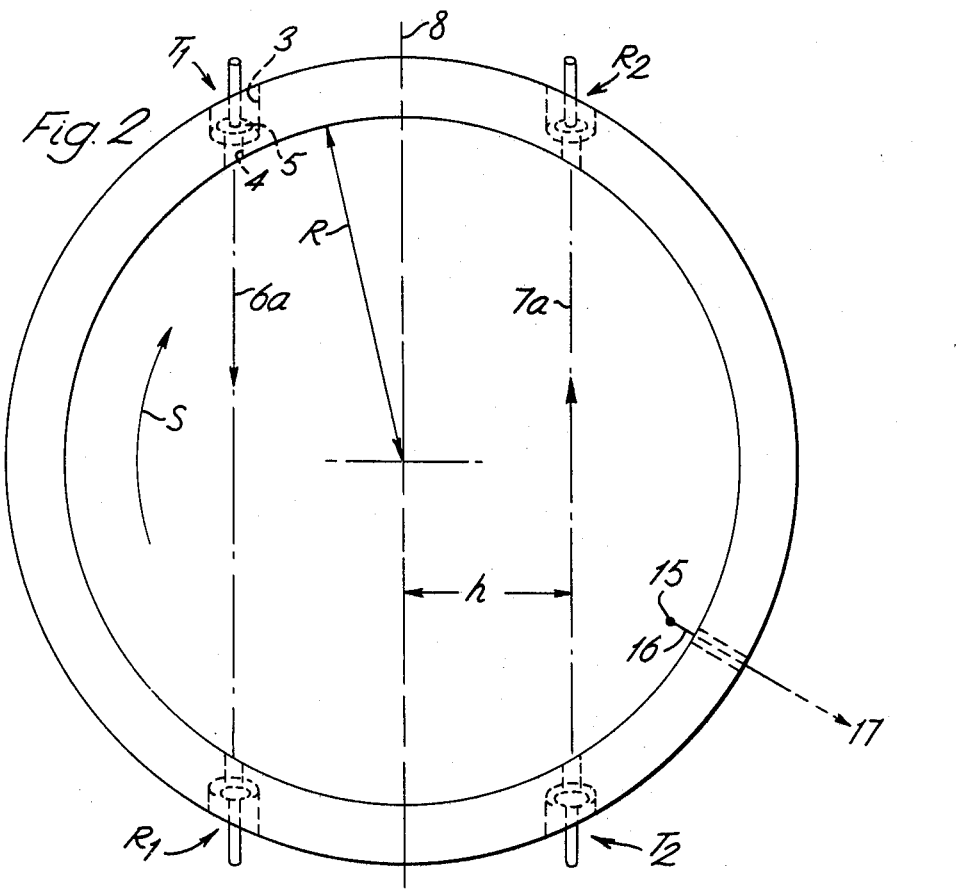
FIG. 2 is a diagrammatic end elevation of the same flowmeter.
Figure 3:
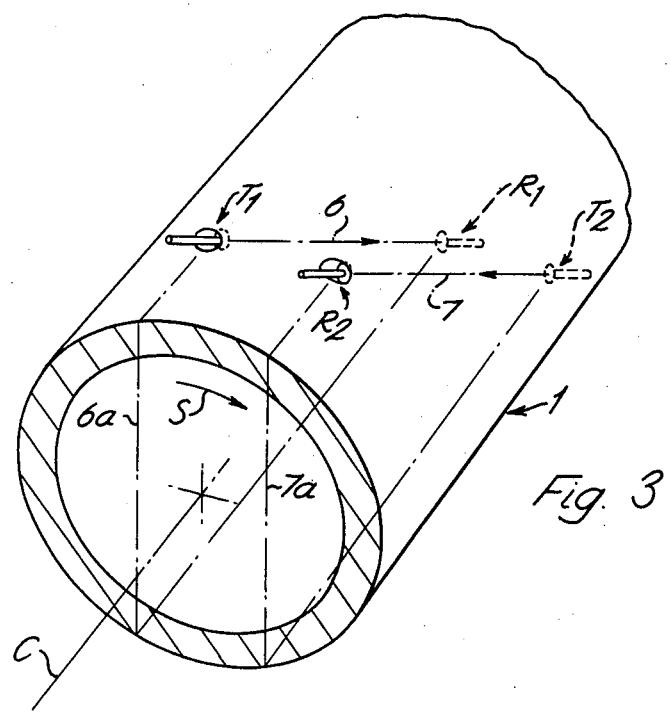
FIG. 3 is a diagrammatic perspective view of the same flowmeter.
Figure 6:
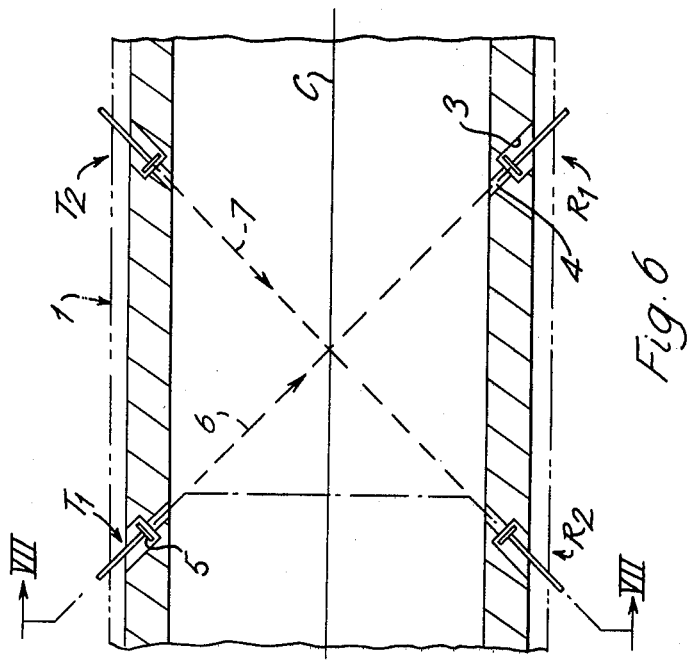
Figure 7:
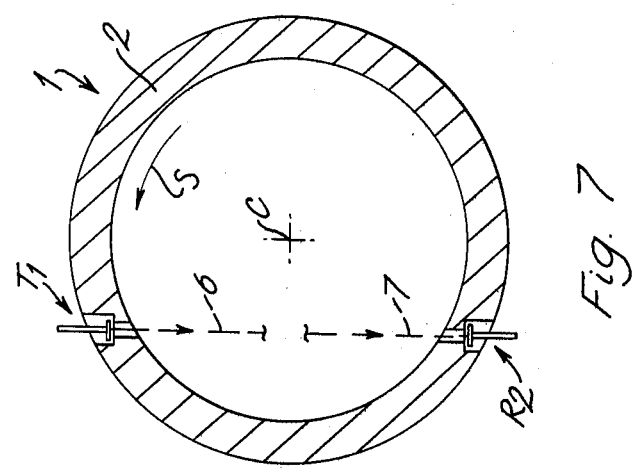

FIG. 6 is a diagrammatic section through another flowmeter, parallel to the axis and in the plane of both the acoustic paths, and FIG. 7 is a section on the line VII — VII in FIG. 6, The flowmeter of FIGS. 1 to 3 comprises a cylindrical pipe 1 with axis (or centre line) $c$. Transmitter/receiver pairs $T_1$, $R_1$ and $T_2$, $R_2$ are mounted in the wall of the pipe. Each transmitter or receiver is mounted in a recess 3 drilled obliquely into the outside of wall 2 of pipe 1, and communicating with the bore of the pipe by a narrow passage 4 (FIG. 2) coaxial with the recess. The electrode 5 of the transmitter or receiver must of course be sealed to the recess so that the fluid within the pipe cannot leak out through the passages and recesses. Fluid flows along pipe 1 in the direction of arrow A (FIG. 1), and $T_1$ and $R_1$ define between them an acoustic path 6, lying oblique to the flow of fluid but in a generally downstream direction, while $T_2$ and $R_2$ define between themselves an acoustic path 7 that is similar but lies in a generally upstream direction. Paths 6 and 7 are of equal length, each lie at an angle $\theta$ to the plan plane including the axis $c$, and as shown in FIG. 2 lie in parallel planes $6a$, $7a$, one to either side of the parallel plane 8 that includes axis $c$, and are each separated from that plane by a distance equal to about one half of the internal radius R of the pipe.

Transmitters $T_1$ and $T_2$ are fed with synchronized phase-comparable signals from an oscillator 9, and the outputs of $R_1$ and $R_2$ pass by way of channels 10 and 11 to a signal-conditioning unit 12 and a fractional phase meter 13, and thence to a display 14. The phase difference measured by meter 13 arises of course from the fact that the signals emitted simultaneously from transmitters $T_1$ and $T_2$ do not arrive at the respective receivers at the same time; those from $T_2$ have been retarded by travelling through the fluid in a direction generally against its flow, while those arriving at $R_1$ have been advanced by travelling generally with the fluid.

In order that comparison between the time taken by the two signals to travel their respective paths should be insensitive to swirl of the fluid within the pipe (direction indicated by arrows) it is necessary that the swirl should contribute the same component, in sign, to the velocity of each signal. Equality in magnitude is achieved by locating the paths with symmetry relative to axis $c$, and in sign by arranging the directions of the signals so that they are both either in the same sense (clockwise or anti-clockwise) as, or in the opposite sense to the swirl about axis $c$. Thus FIG. 2 shows signal paths located on opposite sides of the axis, with a clockwise swirl s and with both signals having an anti-clockwise sense. In the alternative flowmeter shown in FIGS. 6 and 7 both signal paths lie on the same side of axis $c$, planes $6a$ and $7a$ are in effect coincident, there is an anti-clockwise swirl $s$ and the signals along paths 6 and 7 both have an anti-clockwise sense also.

Figure 4:
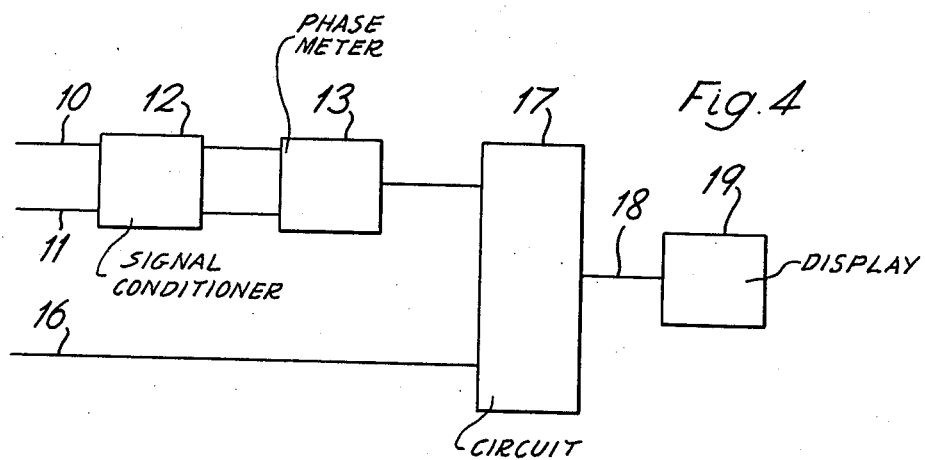
FIG. 4 is a schematic diagram of part of a mass flow-meter.

If the apparatus is to be used to give an output indicating the mass flow rate of the fluid rather than its velocity, then as shown in FIGS. 2 and 4 a pressure sensor 15 mounted from the pipe wall 2 within the measurement zone may feed a signal by way of line 16 to a circuit 17 which also receives the output of meter 13, and the output of the circuit may travel by way of line 18 to an alternative display unit 19.

Let us assume that two signals have travelled an equal distance along paths 6 and 7 respectively and are instantaneously phase-synchronized, then after each travelling a further and equal short distance along their respective paths it can be shown that their fractional phase-shift $\Delta p$ will be:

$$\Delta p = \frac{2f}{\tan\theta \, C^2} \int_{-\sqrt{R^2-h^2}}^{+\sqrt{R^2-h^2}} V(r) \cdot dl = \quad \text{(ii)}$$

$$\frac{2f}{\tan\theta \, C^2} \int_{-\sqrt{R^2-h^2}}^{+\sqrt{R^2-h^2}} V(\sqrt{h^2+l^2}) \, dl$$

assuming $C^2$ is much greater than $\overline{V}^2 \cos^2\theta$. In this equation C and $\theta$ are as before, R is the pipe radius, $f$ is the signal frequency, $h$ (see FIG. 2) is the off-centre distance of each acoustic path from the centre line of the pipe, V(r) is a function describing the flow pattern existing across and within a cross-section of the pipe, $V(\sqrt{h^2+l^2})$ is the same function but expressed in terms of $h$ and $l$, $l$ and $dl$ are quantities related to the acoustic path length and to an element of that length, and $\overline{V}$ is the mean flow velocity which it is desired to determine.

It has been shown by experience that for flows down circular pipes the equation:

$$V(y) = V(c) \cdot \left(\frac{y}{R}\right)^{\frac{1}{n}} \quad \text{(iii)}$$

generally applies, where V(c) is the velocity of the fluid along the centre line, V(y) is the fluid velocity at points situated a distance $y$ from the pipe wall, and n is a constant of value dependent upon the Reynolds number of the flow. From equation (iii) the mean flow velocity $\overline{V}$ within the pipe may be shown to obey the equation:

$$\overline{V} = \frac{2n^2 \cdot V(c)}{(1+2n)(1+n)} \quad \text{(iv)}$$

and by combining equations (ii) to (iv), substituting for $y$ in terms of R and $r$ and allowing for geometrical factors the following equation may be produced:

$$\Delta p = \frac{2\overline{V}f(1+2n)(1+n)}{\tan\theta \cdot n^2 C^2} \int_0^{\sqrt{R^2-h^2}} \left\{ \frac{(R-\sqrt{h^2+l^2})^{\frac{1}{n}}}{R^{\frac{1}{n}}} \right\} dl \quad \text{(v)}$$

Figure 5:
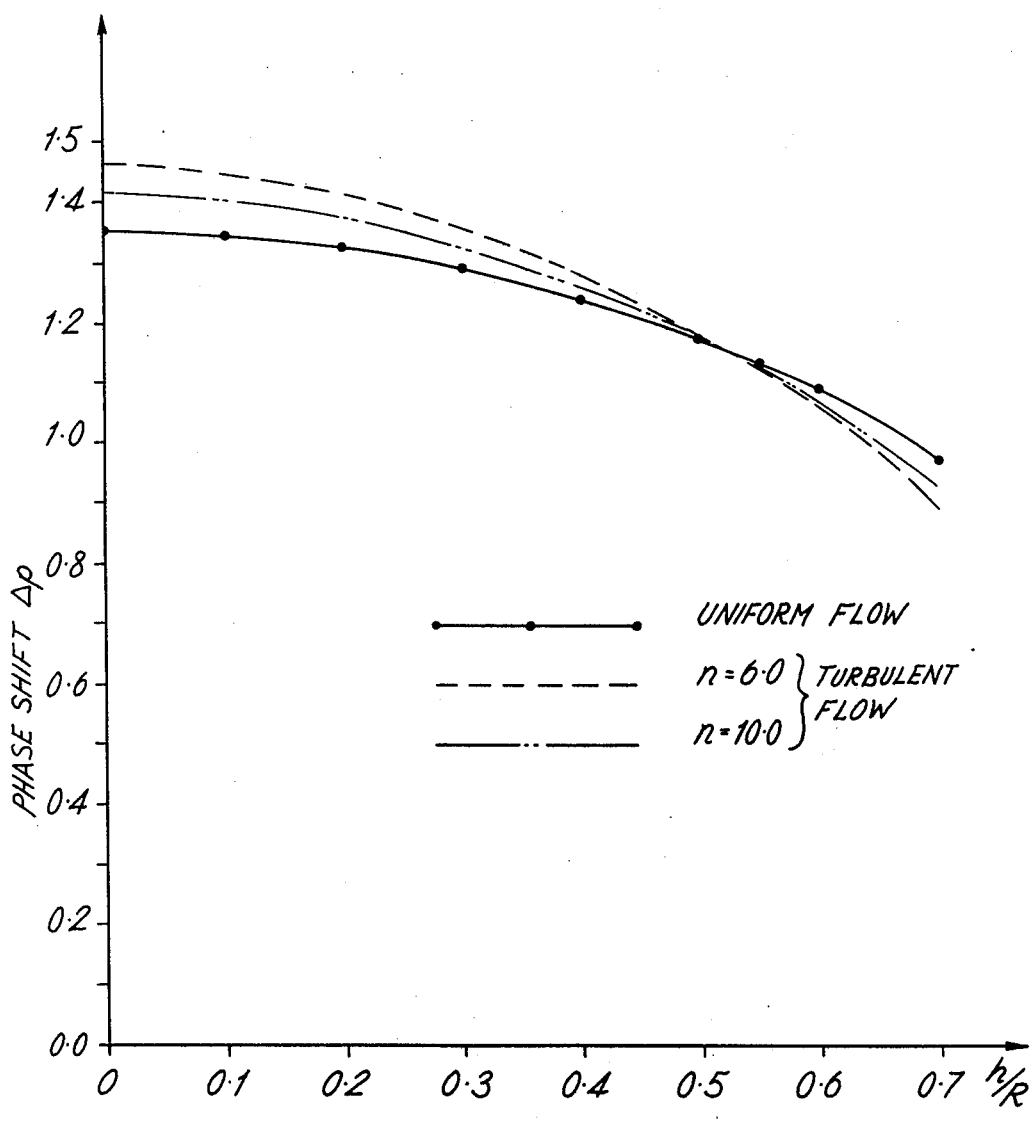
FIG. 5 is a graph.

Evaluating equation (v) and plotting the resulting values of phase shift against $h/R$ for three computed flow profiles, the graph of FIG. 5 was obtained. FIG. 5 assumes $C = 344$ m/s, $R = 1m$ (unit radius), $f = 40000$ Hz and $\theta = 45°$. Two of the graphical functions represent typical turbulent flows with values for n of 6 and 10 (equivalent to Reynolds numbers of about $4 \times 10^3$ and $3.2 \times 10^6$) and the third function simulates a flow with uniform profile, such as would exist if n were infinite. FIG. 5 clearly shows that when planes 6a and 7a lie at $h/R = 0.5$, the phase shifts recorded for all three flows are very nearly equal, but that the discrepancies in phase shift for the three flows increase steadily as $h/R$ moves substantially away from 0.5 towards the opposite extreme values of 0 and 1.0.

By plotting error (i.e. percentage deviation of observed phase shift against the true value of the quantity, determined by other methods) against Reynolds number for a series of test flows, a related result was obtained. Again it was clearly demonstrated that selection of the value $h/R = 0.5$ makes the readings of the apparatus for flows of different n value more consistent than is possible where $h/R$ equals 0, and is already known, or where it has other haphazard values. However, by plotting error against Reynolds number it was also indicated that whereas a value of $h/R$ of exactly 0.5 is exactly right when the apparatus is to used to measure only uniform and laminar flows, the value $h/R = 0.52$ or more exactly 0.523 may be best if the apparatus is to measure flows lying only within the turbulent range. If the apparatus must be prepared for a range of flows from laminar to near-uniform through the whole turbulent range a compromise figure such as $h/R = 0.505$ may be best.

A more detailed analysis of the axisymmetrical flow of fluid down a pipe of circular cross-section and unit radius involves the formulae:

$$V(r) = V(c) \cdot \left(1 + A\left(\frac{r}{R}\right)^B\right) \quad \text{(vi)}$$

and $$\overline{V} = V(c) \cdot \left(1 + \frac{2A}{B+2}\right) \quad \text{(vii)}$$

where V(r) is the velocity of the fluid at radius $r$, V(c) is as before and A and B are constants. By combining these equations with equation (ii), and making substitutions similar to those made before, the equation:

$$\Delta p = \frac{4f\overline{V}}{C^2 \tan\theta \left(1 + \frac{2A}{B+2}\right)} \int_0^{\sqrt{R^2-h^2}} \left\{1 + \frac{A(h^2+l^2)^{\frac{B}{2}}}{R^B}\right\} dl \quad \text{(viii)}$$

results. Assuming B equals 2, indicating that the flow profile follows a parabolic law of which laminar flow is one special case and uniform flow may be considered another, then by integrating we obtain the equation:

$$\Delta p = \frac{K\overline{V}}{1+\frac{A}{2}}\left(1 + \frac{A}{3} + \frac{2h^2 A}{3R^2}\right) \quad \text{(ix)}$$

where K is a constant. When $h/R$ equals 0.5, it will be seen that the right-hand side of this equation simplifies to a function independent of the term A, which is itself related to velocity profile and is thus a term which this invention seeks to avoid. The equation thus simplifies to a form in which phase shift $\Delta p$ is equated to mean velocity $\overline{V}$ multiplied by a constant, which is theoretically exactly what is desired.

In modifying the apparatus so that it acts as a gas mass flowmeter, and feeding in (by way of line 16, FIG. 2) a measure of the fluid pressure Pr within the measured zone, the mass flow rate ṁ may be found by solution of the equation:

$$\Delta p = \frac{K^1 \dot{m}}{Pr} \quad (x)$$

Here $K^1$ appears as a constant but includes terms dependent upon the ratio $\gamma$ of the specific heats of the gas; $\gamma$ has well known values for most common gases. $K^1$ also depends to a much smaller extent on other properties of the gas, e.g. its density. The pressure of the measured medium can easily be fed to the circuit 17 of the apparatus, and if the medium is one of the common gases the approximate or even more exact value of $\gamma$ can also be supplied.

If the invention is to be used to determine the flow velocity of liquid down a pipe instead of gas, account has to be taken of the fact that liquid is virtually incompressible; for an instrument to act as a mass flowmeter rather than a volumetric flowmeter, the density of the liquid must be known or determined.

Although the foregoing description and especially most of the formulae have related to fluid flow down pipes of circular cross-section, the invention includes apparatus in which measurement takes place in other axisymmetric pipes of different cross-section, but in which the planes in which the signals travel are displaced from the axis of the pipe so as to diminish the influence of velocity profile upon the readings. The acoustic transducers used may be mounted in or even outside the walls of the tube without projecting bodily into the bore and thus without physically impeding the flow at all, provided the angle of incidence of the beams to the tube walls is not so great as to give rise to total reflection, unacceptable absorption or reflection losses or the like. It should also specially be noted that the invention is based on the assumption that acoustic paths 6 and 7 are nominally of no thickness, and are in practice thin compared with the diameter of the pipe. In one piece of apparatus already tested a pipe of 100 mm. internal diameter has been used for air flow velocity measurement up to a maximum flow velocity of 10 m/s, with a potential of up to about 17 m/s. Angle $\theta$ has been about 45° and the frequency of the ultrasound has been about 40 kHz.

The invention has been described with reference to an example in which flow (or mass flow) rate has been derived from observing the phase-difference at receivers of two alternating signals previously transmitted in phase-synchronism. However it is clearly also possible to work such a system if the signals leave the transmitter unsynchronised but with a known phase difference between them. It will also be seen that the measurement depends essentially on the difference in time taken for signals to travel two similar acoustic paths, one relatively against the flow and the other with it; this difference can be determined not only by phase-change measurements of alternating signals but also for instance by observing the difference between the transmit time of two pulsed signals. It is also possible to work the invention with one pair of transducers that can be switched, electronically for instance, so as to transmit and receive signals between them in alternate directions, the two signal paths thus being coincident in line but opposite in direction and time-comparison being made between the transit time of a signal transmitted in one direction and a subsequently signal in the other. With such an arrangement some compensation for swirl would have to be made since swirl would affect the two signals differently.

We claim:

1. Apparatus for measuring the flow of fluid down a pipe of circular cross-section comprising:
    an acoustic transmitter/receiver system including first and second pairs of receivers and transmitters, said pairs defining respective first and second acoustic paths for the passage of signals from a transmitter to a receiver, each said acoustic path lying in a plane parallel to the pipe axis but separated from it by a distance within the range of 0.50 R to 0.523 R where R is the pipe radius and the number of paths being no greater than two; said first path having a component of direction generally upstream relative to said flow; said second path having a component of direction generally downstream relative to said flow;
    means for transmitting time-comparable signals along said first and second paths; and
    means to compare the signals received at the ends of said first and second paths and to derive an output indicative of the mean velocity of said fluid flow, the phase difference between said received signals being an algebraic function including a term dependent only upon the flow velocity profile within said pipe.

2. Apparatus according to claim 1, in which:
    said acoustic transmitter/receiver system transmits phase-comparable alternating signals.

3. Apparatus according to claim 1, in which:
    each said pair defines a separate one of said first and second acoustic paths.

4. Apparatus according to claim 1, in which:
    said first and second acoustic paths are of equal length and have symmetry about said pipe axis; and
    the plane of each of said acoustic paths substantially bisects a radius of said pipe and meets the radius at right angles.

5. Apparatus according to claim 4 in which said first and second acoustic paths both lie in substantially the same said plane.

6. Apparatus according to claim 4 in which the said planes of said first and second acoustic paths lie on opposite sides of said pipe axis.

7. Apparatus according to claim 1 in which the said signals are of ultrasonic energy.

8. Apparatus according to claim 1 including means to introduce to the apparatus factors indicative of the cross-sectional area of said pipe within the region of said acoustic transmitter/receiver system and of the character of said fluid, whereby to modify said output to give an indication of the mass of said fluid flowing through said pipe in unit time.

* * * * *